United States Patent [19]

Masuda et al.

[11] Patent Number: 5,529,832
[45] Date of Patent: Jun. 25, 1996

[54] BIAXIALLY ORIENTED LAMINATED POLYESTER FILM

[75] Inventors: Shigeyoshi Masuda, Zama; Masami Etchu, Yokohama, both of Japan

[73] Assignee: Teijin Limited, Osaka, Japan

[21] Appl. No.: 338,814

[22] Filed: Nov. 10, 1994

[51] Int. Cl.⁶ .......................... G11B 23/00; G11B 5/704; B32B 27/36
[52] U.S. Cl. .......... 428/212; 428/331; 428/332; 428/483; 428/694 SL; 428/906; 428/910; 428/900
[58] Field of Search ............... 428/694 SL, 483, 428/212, 331, 332, 910, 900

[56] References Cited

U.S. PATENT DOCUMENTS

| 5,093,208 | 3/1992 | Heyes et al. | 428/458 |
|---|---|---|---|
| 5,106,681 | 4/1992 | Endo et al. | 428/323 |

FOREIGN PATENT DOCUMENTS

| 0501315 | 9/1992 | European Pat. Off. . |
|---|---|---|
| 0551905 | 7/1993 | European Pat. Off. . |
| 0567973 | 11/1993 | European Pat. Off. . |
| 0572224 | 12/1993 | European Pat. Off. . |
| 0590570 | 4/1994 | European Pat. Off. . |
| 0609060 | 8/1994 | European Pat. Off. . |
| 0616320 | 9/1994 | European Pat. Off. . |
| 481806 | 12/1982 | Japan . |
| 63-289029 | 11/1988 | Japan . |
| 1284534 | 11/1989 | Japan . |
| 2143836 | 6/1990 | Japan . |
| 3211054 | 9/1991 | Japan . |

OTHER PUBLICATIONS

AB-85-293477/47 for JP 2081806-B.
W. Goerlitz, et al., *Journal of Magnetism and Magnetic Materials*, 120 (1993) Mar. I, No. 1/3, pp. 76–82.
Japanese Patent Abstracts (Examined) Week 9506, Derwent Publications, Ltd., AN 95-040815 (& JP-A-6 320 691, Nov. 22, 1994).
English language abstract of EP 257,611.

*Primary Examiner*—P. C. Sluby
*Attorney, Agent, or Firm*—Sherman and Shalloway

[57] ABSTRACT

A biaxially oriented laminated polyester film comprising a first polyester surface layer having (a1) a central line average roughness $R_{aA}$ of 1 to 7.9 nm, (b1) a 10-points average roughness $R_{ZA}$ of 15 to 400 nm and (c1) an $R_{ZA}/R_{aA}$ ratio of 11–51, and a second polyester surface layer having (a2) a central line average roughness $R_{aB}$ which is greater than $R_{aA}$ and is 5 to 40 nm, (b2) a 10-points average roughness $R_{ZB}$ of 75 to 600 nm and (c2) an $R_{ZB}/R_{aB}$ ratio of 20 or less, and satisfying the relationship between the first polyester surface layer and the second polyester surface layer, which is represented by the following expressions, $$R_{aA} \times R_{aB} < 50 \tag{1}$$

$$R_{ZA} \times R_{ZB} = 130 \text{ to } 3,000 \tag{2}$$

This biaxially oriented laminated polyester film is excellent in lubricity, high-speed take-up properties, processability and electromagnetic characteristics when used for a magnetic film, and is particularly useful as a base film for a magnetic recording medium.

12 Claims, 1 Drawing Sheet

BIAXIALLY ORIENTED LAMINATED POLYESTER FILM

DETAILED DESCRIPTION OF THE INVENTION

Figure 1:
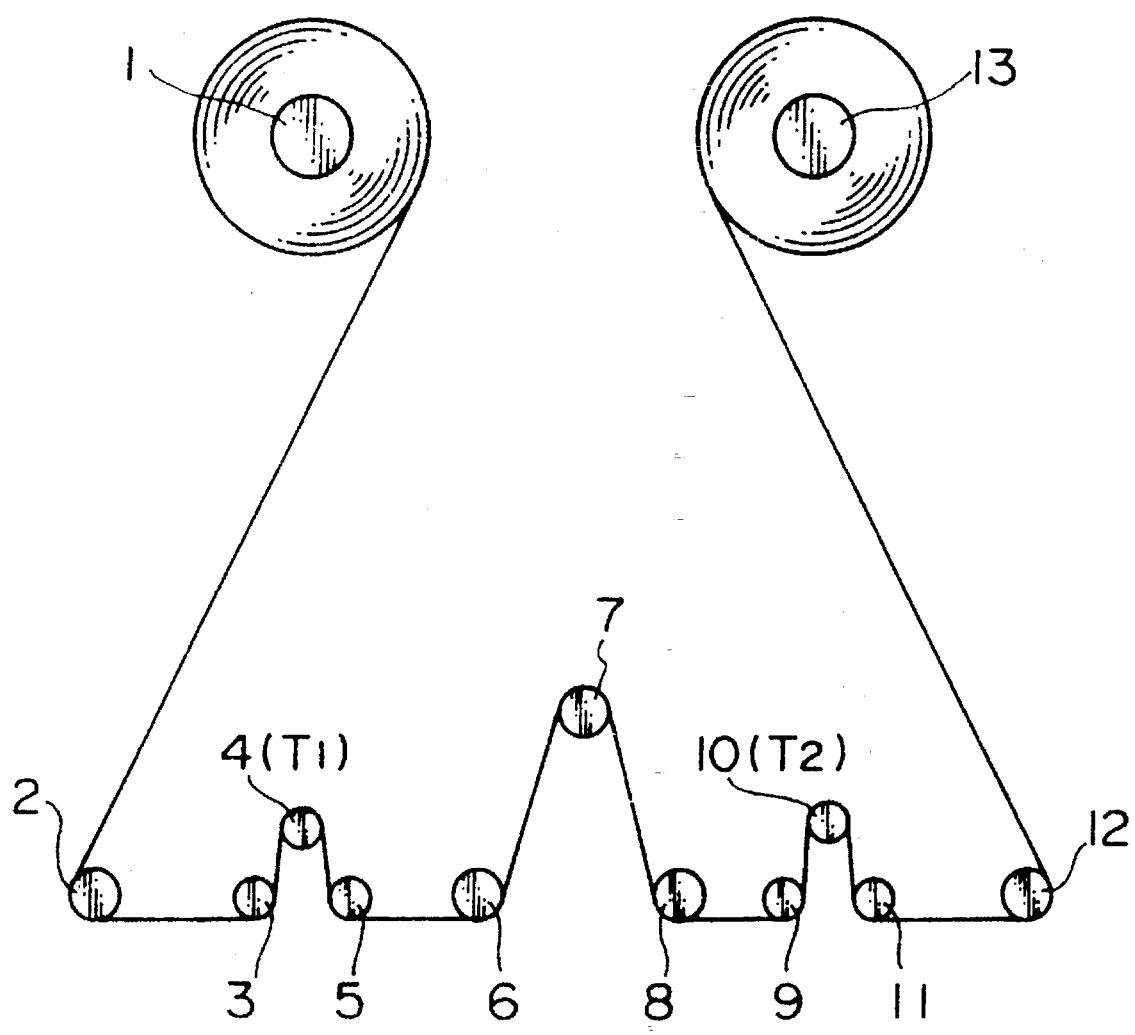

The present invention relates to a biaxially oriented laminated polyester film. More specifically, it relates to a biaxially oriented laminated polyester film which is excellent in lubricity, high-speed take-up properties, processability and electromagnetic characteristics when used for a magnetic film, and is particularly useful as a base film for a magnetic recording medium.

A biaxially oriented polyester film has excellent properties and therefore is widely used in the fields of magnetic tapes, electric appliances, photography, metallizing and packaging. Above all, due to its high strength and elastic modulus, it is widely used as a base film for magnetic recording media such as a video tape, an audio tape, a computer tape and a floppy disk.

In the field of the above media, the demand for high-density recording and high quality is increasing in recent years, and in consequence, the polyester film as a base film is increasingly required to have flat surface.

However, with an increase in the degree of a film surface flatness, for example, a film for a magnetic tape has a problem in that the film has an increased coefficient of friction and is liable to have a running failure or undergo scratching. Another problem is that, with an increase in the degree of film surface flatness, the form of a take-up film is extremely deteriorated in the step of taking up a film, and it is difficult to obtain a take-up film roll having a good form. Further, it is required to increase the take up rate and broaden the film to cope with the higher film productivity which is being demanded, and these requirements make it more and more difficult to obtain a take-up film roll having a good form.

A polyester film as a base film is therefore required to be excellent not only in flatness but also lubricity for obtaining a good take-up form.

For improving a film in the lubricity, there has been proposed a method in which inorganic fine particles of silicon oxide or calcium carbonate are incorporated into a polyester, or a method in which fine particles containing calcium, lithium or phosphorus are precipitated in a polymerization system for synthesizing a polyester. In these methods, a film is improved in lubricity by forming fine projections of fine particles on the film surface when a polyester is formed into a film.

In the above methods of improving a film in the lubricity with the fine projections of fine particles, the lubricity improves generally with increased roughness of the film surface. However, when the above surface-roughened film is used as a base film for a magnetic recording medium, the surface of a magnetic layer obtained by applying a magnetic coating composition on the above surface-roughened film is also roughened due to the roughened surface of the base film, and the electromagnetic characteristics tends to deteriorate.

Japanese Laid-open Patent Publication No. 289029/1988 discloses an invention of a single-layered polyester film containing 0.01 to 5.0% by weight of substantially amorphous, spherical silica fine particles (fine particles (A)) which are obtained by the hydrolysis and condensation reactions of alkoxysilane, has an average particle diameter of 0.01 to 3.0 μm and has a $[d_{10}/d_{90}]$ value, defined by the following equation, $$[d_{10}/d_{90}] = \frac{\text{particle diameter of 10\% accumulated particle number}}{\text{particle diameter of 90\% accumulated particle number}}$$

in the range of 1.1 to 2.7, and 0.005 to 1.0% by weight of fine particles (B) which have a $[D_2/D_1]$ value, defined by the following equation, $$[D_2/D_1] = \frac{\text{average particle diameter of fine particles } (B)}{\text{average particle diameter of fine particles } (A)}$$

in the range of 1.1 to 3.0.

Japanese Laid-open Patent Publication No. 284534/1989 discloses an invention of a single-layered polyester film formed of a polyester containing 0.01 to 2.0% by weight of spherical silica particles, as a first component, which have an average particle diameter of 0.12 to 0.6 μm and an aspect ratio (long diameter/short diameter) of 1.0 to 1.2, and 0.005 to 1.8% by weight, which should be smaller than the amount of the first component, of spherical silica particles, as a second component, which have an average particle diameter which is smaller than that of the first component by at least 0.1 μm and is in the range of at least 0.02 to less than 0.5 μm and have an aspect ratio (long diameter/short diameter) of 1.0 to 1.2.

On the other hand, as one method for accomplishing flatness and lubricity which are contradictory to each other, there has been proposed a method using a biaxially oriented laminated film of which the surface roughness is different between a front surface and a reverse surface, such as a film of which one surface is flat and the other surface is roughened so as to have lubricity.

In the above method, however, one surface is flat, and consequently, an improvement in take-up properties should be secured by the other roughened surface alone. As a result, for achieving the take-up properties equivalent to those of a single-layered film of which the front and reverse surfaces have the same roughness, the roughened surface of the above laminated film is required to have a higher roughness than the roughness of the single-layered film, and it is necessary to roughen the surface by incorporating a large amount of inert fine particles.

Japanese Laid-open Patent Publication No. 43836/1990 discloses an invention of a biaxially oriented laminated polyester film of which at least one surface has a surface roughness parameter (ratio of a distance Rt between a highest peak of a roughness curve and a deepest bottom of the roughness curve to a central line average roughness Ra; Rt/Ra) of 8.0 or less, obtained by stacking a polyester having an intrinsic viscosity of 0.56 to 0.8 and containing particles having an average particle diameter of 0.02 to 1.0 μm in a thickness of 0.2 to 5 μm on at least one surface of a polyester film and biaxially orienting the resultant laminate so that the product of stretch ratios in the longitudinal and transverse directions is at least 10 times.

Japanese Laid-open Patent Publication No. 211054/1991 discloses an invention of a biaxially oriented polyester film containing a lubricant and having surface or surfaces having a number of fine projections, wherein:

one exposed surface (surface A) of said film is a lubricating surface having an average roughness ($Ra_A$) of 0.01 to 0.03 μm, the other exposed surface (surface B) of said film is a flat surface having an average roughness ($Ra_B$) of less than 0.15 μm and satisfying $Ra_B < Ra_A$, and an air leakage rate in a film/film interface is 300 seconds or less.

Japanese Laid-open Patent Publication No. 81806/1992 discloses a composite film for a metal-applied 8-mm video tape, which is a composite film unidirectionally or bidirectionally toughened by coextrusion, biaxially stretching and restretching, and comprises a film forming one exposed surface (surface A) and giving a flat smooths-surface having a central line average roughness $Ra^{(1)}(\mu)$ of 0 to 0.015 and a film forming the other exposed surface (surface B) and giving a lubricating surface having a central line average roughness $Ra^{(2)}(\mu)$ of 0.005 to 0.030, wherein: $Ra^{(1)}$ and $Ra^{(2)}$ satisfies the following expression [I], $$0.005 \leq R^{(2)} - R^{(1)} \leq 0.015 \quad [I]$$

an $F_5$ value (kg/mm$^2$) (tensile strength at 5% extension) of the film in the longitudinal direction satisfies the following expression [II], $$16 \leq F_5 \quad [II]$$

and the number of scratches as great as at least 0.1 mm on the surface A is 0 to 500 per mm$^2$.

In recent years, magnetic recording tends to be effected in an increasingly higher density, and the flat surface of the base film therefor is required to have a higher degree of flatness. When the roughened surface of the base film is therefore further roughened in view of take-up properties, the base film causes the following problems: The base film shows a decrease in abrasion resistance when processed to form a magnetic tape, a concavoconvex surface form of the roughened surface is imprinted on a magnetic layer formed on the flat surface due to a tightening of a take-up film roll thereby to roughen the magnetic layer surface, and the magnetic tape shows deteriorated electromagnetic characteristics.

The present inventors have made diligent studies to overcome the above problems and develop a film which has a flatness suitable for use in a high-quality magnetic tape, which has excellent take-up properties and gives excellent roll form when taken up and which also has excellent abrasion resistance and processability, and as a result, the present invention has been arrived at.

It is an object of the present invention to provide a biaxially oriented laminated polyester film which retains a flatness that can meet with the achievement of the high density recording and high quality of a magnetic tape, which has excellent take-up properties and gives an excellent roll form, and which is also excellent in lubricity, abrasion resistance and scratch resistance.

Other objects and advantages of the present invention will be apparent from the following description.

According to the present invention, the above object and advantages of the present invention are achieved by a biaxially oriented laminated polyester film comprising a first polyester surface layer having (a1) a central line average roughness $R_{aA}$ of 1 to 7.9 nm, (b1) a 10-points average roughness $R_{ZA}$ of 15 to 400 nm and (c1) an $R_{ZA}/R_{aA}$ ratio of 11–51, and a second polyester surface layer having (a2) a central line average roughness $R_{aB}$ which is greater than $R_{aA}$ and is 5 to 40 nm, (b2) a 10-points average roughness $R_{ZB}$ of 75 to 600 nm and (c2) an $R_{ZB}/R_{aB}$ ratio of 20 or less, and satisfying the relationship between the first polyester surface layer and the second polyester surface layer, which is represented by the following expressions, $$R_{aA} \times \sqrt{R_{aB}} < 50 \quad (1)$$

$$R_{ZA} \times \sqrt{R_{ZB}} = 130 \text{ to } 3{,}000. \quad (2)$$

In the present invention, the polyester to constitute the film is preferably selected from polyesters composed mainly of alkylene terephthalate and/or alkylene naphthalate.

Of the above polyesters, preferred are copolymers in which at least 80 mol % of total carboxylic acid-components are derived from terephthalic acid and/or 2,6-naphthalenedicarboxylic acid and at least 80 mol % of total glycol components are derived from ethylene glycol, including polyethylene terephthalate and polyethylene-2,6-naphthalate. In this case, less than 20 mol % of the total acid components may be from aromatic dicarboxylic acids other than the terephthalic acid and/or 2,6-naphthalenedicarboxylic aid, such as isophthalic acid, biphenyldicarboxylic acid, diphenyl ether dicarboxylic acid, diphenylethanedicarboxylic acid, diphenylsulfonedicarboxylic acid and diphenylketonedicarboxylic acid, aliphatic dicarboxylic acids such as adipic acid and sebacic acid, and alicyclic dicarboxylic acids such as cyclohexane-1,4-dicarboxylic acid. Further, less than 20 mol % of the total glycol components may be from glycols other than ethylene glycol, such as trimethylene glycol, tetramethylene glycol, pentamethylene glycol, hexamethylene glycol and decamethylene glycol, alicyclic glycols such as cyclohexanedimethanol, aromatic diols such as hydroquinone, resorcin and 2,2-bis(4-hydroxyphenyl)propane, aromatic ring-containing aliphatic diols such as 1,4-dihydroxymethylbenzene, and polylakylene glycols (polyoxyalkylene glycols) such as polyethylene glycol, polypropylene glycol and polytetramethylene glycol.

The polyester used in the present invention also includes (co)polyesters in which less than 20 mol %, based on a total of dicarboxylic acid component and hydroxycarboxylic acid component, of a component derived from aromatic hydroxy acids such as hydroxybenzoic acid and aliphatic hydroxy acids such as ω-hydroxycaproic acid is copolymerized or bonded.

Further, the polyester used in the present invention includes a copolymer comprising a component derived from a polycarboxylic acid or polyhydroxy compounds having at least three functional groups, such as trimellitic acid or pentaerythritol in such an amount that the polyester is substantially linear, such as 2 mol % or less based on total carboxylic acid components.

The above polyesters per se are known, and can be produced by a method known per se.

The intrinsic viscosity, measured in o-chlorophenol at 35° C., of the above polyester is preferably about 0.4 to 0.8, more preferably 0.5 to 0.7, particularly preferably 0.55 to 0.65.

The biaxially oriented laminated polyester film of the present invention is formed of at least two layers. These two layers may be the same or different, while the two layers are preferably the same.

In the biaxially oriented laminated polyester film of the present invention, the surface central line average roughness ($R_{aA}$: unit nm) of one surface layer (first polyester surface layer) is required to be 1 to 7.9 nm. When $R_{aA}$ is too large, the take-up properties improve, while the magnetic tape shows poor electromagnetic characteristics. When it is too small, undesirably, the film shows poor lubricity and is liable to form bump-like projections or give a poor form of a roll when taken up in the form of a roll. In view of these, $R_{aA}$ is preferably 1 to 5.8 nm, more preferably 2 to 4.8 nm.

The first polyester surface layer is required to have a 10-points average roughness $R_{ZA}$ of 15 to 400 nm. $R_{ZA}$ is preferably 40 to 240 nm, more preferably 40 to 130 nm.

In the first polyester surface layer, further, the ratio ($R_{ZA}/R_{aA}$) of the 10-points average roughness ($R_{ZA}$: unit nm) to the central line average roughness ($R_{aA}$) is required to be 11–51. When this ratio ($R_{ZA}/R_{aA}$) is too small, undesirably, the film shows poor air-squeezing performance, is liable to form an uneven end face when taken up in a form of roll, and shows poor take-up properties. In view of these, this ratio ($R_{ZA}/R_{aA}$) is preferably 13 to 30, particularly preferably 14 to 21.

The above surface properties of the above first polyester surface layer can be attained, mainly, by incorporating inert fine particles into the polyester which forms the first polyester surface layer, and adjusting the average particle diameter and content of the inert fine particles.

The polyester containing inert fine particles can be generally produced by adding the inert fine particles (preferably in the form of a slurry thereof in the glycol) to a reaction system when a reaction for forming the polyester is carried out, for example, during the ester-exchange reaction in the ester-exchange method, at any time during the polycondensation reaction, or at any time in the direct polymerization method. Preferably, the inert fine particles are added to the reaction system at an initial time of the polycondensation reaction, for example, before the reaction mixture has an intrinsic viscosity of about 0.3.

Examples of the inert fine particles include (1) silicondioxide (including hydrate, siliceous sand and silica); (2) alumina; (3) silicates containing at least 30% by weight of $SiO_2$ (such as amorphous or crystalline clay mineral, alumino silicate (including calcined products and hydrate), chrysotile, zircon and fly ash); (4) oxide of Mg, Zn, Zr or Ti; (5) sulfates of Li, Na or Ca (including monohydrate and dihydrate); (7) benzoate of Li, Na or K; (8) terephthalate of Ca, Ba, Zn or Mn; (9) titanate of Mg, Ca, Ba, Zn, Cd, Pd, St, Mn, Fe, Co or Ni; (10) chromate of Ba or Pb; (11) carbon (such as carbon black or graphite); (12) glass (such as glass powder or glass beads); (13) carbonate of Ca or Mg; (14) fluorite; (15) ZnS; and (16) crosslinked polymer particles (such as crosslinked polystyrene particles or crosslinked silicone resin particles).

In the present invention, it is preferred to incorporate two kinds of inert fine particles, inert fine particles having a large average particle diameter and inert fine particles having a small average particle diameter, into the polyester to form the first polyester surface layer.

For example, it is preferred to incorporate 0.05 to 1.5% by weight of first small inert fine particles having an average particle diameter (dx: unit μm) of 0.01 to 0.5 μm and first large inert fine particles having an average particle diameter (dy: unit μm) of 0.1 to 2.5 μm in an amount of ¼ or less of the above first small inert fine particles. The average particle diameter (dy) of the first large inert fine particles is greater than the average particle diameter (dx) of the first small inert fine particles preferably by at least 0.1 μm.

When the average particle diameter (dx) of the first small inert fine particles is too small, or when the content of the first small inert fine particles is too small, blocking is liable to take place when the film is taken up, and the number of bump-like projections in the roll increases. When the average particle diameter (dx) is too large, or the content of the first small inert fine particles is too large, undesirably, the tape is liable to show poor electromagnetic characteristics.

In view of these, the average particle diameter (dx) of the first small inert fine particles is preferably at least 0.05 μm, more preferably at least 0.09 μm, particularly preferably at least 0.15 μm. Further, it is preferably 0.34 μm or less, more preferably 0.29 μm or less, particularly preferably 0.24 μm or less. The content of the first small inert fine particles is preferably at least 0.09% by weight, more preferably at least 0.19% by weight, particularly preferably at least 0.29% by weight. Further, it is preferably 1.2% by weight or less, more preferably 0.9% by weight or less, particularly preferably 0.5% by weight or less.

When the average particle diameter (dy) of the first large inert fine particles is too small, or when the content of the first large inert fine particles is too small, bump-like projections are liable to occur in a roll when the film is taken up. When the average particle diameter (dy) is too large, or the content of the first large inert fine particles is too large, undesirably, the film is liable to form an uneven end face when taken up in the form of a roll. In view of these, the average particle diameter (dy) of the first large inert fine particles is preferably at least 0.2 μm, more preferably at least 0.3 μm, particularly preferably at least 0.4 μm, further particularly preferably at least 0.51 μm. Further, it is preferably 2.0 μm or less, more preferably 1.4 μm or less, particularly preferably 0.9 μm or less. The content of the first large inert fine particles is preferably at least 0.001% by weight, more preferably at least 0.002% by weight, particularly preferably at least 0.003% by weight. Further, it is preferably 0.2% by weight or less, more preferably 0.09% by weight or less, particularly preferably 0.03% by weight or less.

The above first small inert fine particles can be selected from the above-described inert fine particles. Preferred are anhydrous silicic acid, hydrous silicic acid (silicon dioxide), aluminum oxide (alumina), aluminum silicate, titanium dioxide and kaolin. More preferred are silicon dioxide, titanium dioxide and alumina. Alumina is particularly preferred, and above all, θ-alumina is particularly preferred.

The above first large inert fine particles can be selected from the above-described inert fine particles. Preferred are heat-resistant crosslinked polymer particles, calcium carbonate, barium sulfate and silicon dioxide. More preferred are heat-resistant crosslinked polymer particles, and further preferred are crosslinked silicone resin particles and crosslinked polystyrene particles.

As the inert fine particles to be incorporated into the polyester to form the first polyester surface layer, it is preferred to use the above first small inert fine particles and first large inert fine particles, while other third inert fine particles may be incorporated in such an amount that the desired properties of the film are not impaired. The amount of the other inert fine particles based on the total amount of inert fine particles can be 30% by weight or less, and further, it can be 10% by weight or less.

In the biaxially oriented laminated polyester film of the present invention, the central line average roughness ($R_{aB}$: unit nm) of the other surface layer (second polyester surface layer) is required to be greater than the central line average roughness ($R_{aA}$) of the first polyester surface layer.

$R_{aB}$ is preferably greater than $R_{aA}$ and is 5 to 25 nm.

Further, the 10-points average roughness $R_{ZB}$ of the second polyester surface layer is required to be 75 to 600 nm. $R_{ZB}$ is preferably 75 to 350 nm, more preferably 110 to 300 nm.

In the second polyester surface layer, the $R_{ZB}/R_{aB}$ ratio is required to be 20 or less, preferably 5 to 11, more preferably 7 to 11.

In the present invention, the polyester forming the second polyester surface layer preferably contains one or at least two kinds of inert fine particles. When one kind of inert fine particles are incorporated, it is preferred to use second inert medium fine particles having an average particle diameter (de: unit μm) of 0.3 to 2 μm. When this average particle diameter is too small, the film shows poor running and take-up properties. When it is too large, undesirably, the film shows poor abrasion resistance. In view of these, the above average particle diameter (de) is preferably at least 0.4 μm, more preferably at least 0.5 μm. Further, it is preferably 1.4 μm or less, more preferably 0.7 μm or less. Further, the content (We: unit wt %) of the second inert medium fine particles is preferably 0.1 to 5% by weight, and further, the product (de×We) of the average particle diameter and the content (We) is preferably 0.06 to 1.5. The product is preferably at least 0.1, more preferably at least 0.6, particularly preferably at least 0.9, and it is preferably 1.0 or less.

When at least two kinds of inert fine particles are incorporated, it is preferred to use inert fine particles of at least two kinds having different average particle diameters. For example, it is preferred to use 0.05 to 3% by weight of second small inert fine particles having an average particle diameter (dp: unit μm) of 0.03 to 1 μm and 0.005 to 2% by weight of second large inert fine particles having an average particle diameter (dq: unit μm) which is greater than the average particle diameter (dp) by at least 0.1 μm and is 3 μm or less. When the average particle diameter (dp) of the second small fine particles is too small or when the content of the second small inert fine particles is too small, blocking is liable to occur when the film is taken up, and many bump-like projections are liable to occur. When the average particle diameter (dp) is too large or when the content of the second small inert fine particles is too large, undesirably, the film shows poor abrasion resistance. In view of these, the average particle diameter (dp) of the second small inert fine particles is preferably at least 0.05 μm, more preferably at least 0.09 μm, particularly preferably at least 0.16 μm. Further, it is preferably 2.0 μm or less, more preferably 1.4 μm or less, particularly preferably 0.9 μm or less, further particularly preferably 0.7 μm or less.

Further, when the average particle diameter (dq) of the second large inert fine particles is too small or when the difference of the average particle diameter (dq) from the average particle diameter (dp) of the second small inert fine particles is too small, the film is liable to show poor take-up properties because of its poor air-squeezing performance, so that there is a problem in that it is difficult to achieve a high processing rate. In view of these, the average particle diameter (dq) is preferably at least 0.15 μm greater, more preferably at least 0.25 μm greater, particularly preferably at least 0.35 μm greater, further particularly preferably at least 0.6 μm greater, than the average particle diameter (dp). Further, the average particle diameter (dq) is preferably 2.5 μm or less, more preferably 1.9 μm or less, particularly preferably 1.4 μm or less, further particularly preferably 0.9 μm or less.

The biaxially oriented laminated polyester film of the present invention is required to satisfy the relationship between the first polyester surface layer and the second polyester surface layer, which is represented by the following expression.

$$R_{aA} \times \sqrt{R_{aB}} < 50 \quad (1)$$

$$R_{ZA} \times \sqrt{R_{ZB}} = 130 \text{ to } 3{,}000. \quad (2)$$

When $R_{aA} \times \sqrt{R_{aB}}$ of the above expression (1) is too large, undesirably, the surface itself of the film on which a magnetic layer is formed is rough, or the surface roughness of the other surface (running side) is imprinted on the magnetic layer surface to roughen the magnetic layer surface, and the tape shows poor electromagnetic characteristics. In view of these, the value of $R_{aA} \times R\sqrt{R_{aB}}$ is preferably 30 or less, more preferably 20 or less, particularly preferably 13 or less, further particularly preferably 10 or less. The lower limit is preferably 5, more preferably 7.

When $R_{ZA} \times \sqrt{R_{ZB}}$ of the expression (2) is too small, bump-like projections are liable to occur when the film is taken up in the form of a roll. When it is too large, undesirably, the film roll is liable to form an uneven end face. In view of these, the value of $R_{ZA} \times \sqrt{R_{ZB}}$ is preferably at least 200, more preferably at least 400, particularly preferably at least 700. Further, it is preferably 2,000 or less, more preferably 1,500 or less, particularly preferably 1,200 or less, further particularly preferably 1,000 or less.

The thickness of the biaxially oriented laminated polyester film of the present invention is preferably 3 to 20 μm, more preferably 4 to 16 μm. Further, the thickness of the second polyester surface layer is preferably 0.1 to 3 μm, more preferably 0.5 to 2.5 μm.

The biaxially oriented laminated polyester film of the present invention can be produced by any method known in the field of this art. For example, it can be produced by a method in which an unoriented laminated film is first produced and then the unstretched laminated film is biaxially oriented. The unoriented laminated film can be produced by any method known in the field of this art. For example, it can be produced by a method in which a film layer to form a surface and a film layer to form the other surface or a core layer are laminated in a state where the polyester or the polyesters is/are melted or cooled to solidify. More specifically, it can be produced, for example, by a co-extrusion laminating method.

The laminated film obtained by the above method can be biaxially oriented by any method known in the field of this art. For example, the polyester is melted and co-extruded at a temperature between the melting point (Tm: °C.) thereof and (Tm+70)°C. to obtain an unstretched laminated film having an intrinsic viscosity of 0.4 to 0.8 dl/g, and the unstretched film is monoaxially (in the longitudinal or transverse direction) stretched at a stretch ratio of at least 2.5, preferably at least 3, at a temperature between (Tg−10) and (Tg+10)°C. (Tg=glass transition temperature of the polyester), and then stretched in the direction at right angles with the above stretching direction at a stretch ratio of at least 2.5, preferably at least 3, at a temperature between Tg and (Tg+70)°C. The above-obtained biaxially oriented laminated polyester film may be further stretched in the longitudinal and/or transverse direction(s) as required. The total stretch ratio as an area stretch ratio is preferably at least 9, more preferably 12 to 35, particularly preferably 15 to 25. Further, it is preferred to heat-set the biaxially oriented film at a temperature between (Tg+70)°C. and (Tm−70)° (Tm= melting point of the polyester), preferably between 180° C. and 250° C., for 1 to 60 seconds.

The surface hardness of the biaxially oriented laminated polyester film obtained by the above methods is preferably at least 21, more preferably at least 23, particularly preferably at least 28. When the above surface hardness is too low, undesirably, the film shows poor scratch resistance.

The biaxially oriented laminated polyester film of the present invention can be suitably used as a base film for a magnetic recording medium.

That is, according to the present invention, there is provided a magnetic recording medium comprising the biaxially oriented laminated polyester film of the present invention and a magnetic recording layer formed on the first polyester surface layer of the biaxially oriented laminated polyester film.

In the production of the magnetic recording medium, the magnetic recording layer may be formed on the first polyester surface layer of the biaxially oriented laminated polyester film as a base film, for example, by a method in which a magnetic coating composition is prepared by kneading a magnetic powder such as ferromagnetic iron oxide (e.g., $Y-Fe_2O_3$ or co-containing $Y-Fe_2O_3$) or a ferromagnetic metal powder (e.g., pure Fe and iron alloy such as Fe-Ni or Fe-Ni-Co) together with a binder and coated on the first polyester surface layer (nonmagnetic support). The biaxially oriented laminated polyester film of the present invention is particularly suitable for use in magnetic recording media of high quality containing a ferromagnetic iron oxide powder.

The present invention will be detailed hereinafter with reference to Examples.

The physical property values and properties in the present invention were measured and defined as follows.

(1) Average Particle Diameter (d) of Particles

Measured with a CP-50 centrifugal particle size analyzer supplied by Shimadzu Corporation. An accumulation curve of particles and their amounts is prepared on the basis of the obtained centrifugal precipitation curve, and a particle diameter corresponding to a 50 mass percent is determined on the basis of the accumulation curve and taken as the above average particle diameter (Book "Technique of Particle Size Measurement" issued by Nikkan Kogyo Press, 1975, pages 242–247).

(2) Central Line Average Roughness (Ra) and 10-points Average Roughness ($R_z$)

Central line average roughness (Ra) and 10-points average roughness ($R_z$) are measured according to JIS-B601. The present invention uses a contact needle method surface roughness tester (SURFCORDER SE-30C) supplied by Kosaka Laboratory, Ltd. under the following conditions.

(a) Contact needle top end radius: 2 μm
(b) Measurement pressure: 30 mg
(c) Cut off: 0.08 mm
(d) Measurement length: 8.0 mm
(e) How to summarize data: The measurement was carried out eight times on one sample, and the largest value is omitted. The remaining seven values are averaged to determine a central line average roughness (Ra) and a 10-points average roughness ($R_z$).

(3) Static Friction Coefficient ($\mu s$)

A fixed glass sheet is provided, on which two stacked films are placed. The film located below (film contacting the glass sheet) is drawn with a constant-rate roll (about 10 cm/minute), and a detector is fixed on one end (opposite to the draw direction of the film located below) of the film located above to detect a film/film tensile force (F). In this case, a sled placed on the film located above has an undersurface area of 50 cm² (80 mm×62.5 mm) and its surface in contact with the film is formed of a 80° neoprene rubber. It has a weight (P) of 1.2 kg.

The static friction coefficient is calculated on the basis of the following equation.

$$\mu s = \frac{F(g)}{P(g)}$$

(4) Dynamic Friction Coefficient ($\mu k$) of Film

Measured with an apparatus shown in the FIGURE in the following manner. In the FIGURE, numeral 1 indicates an unwinding reel, numeral 2 indicates a tension controller, each of numerals 3, 5, 6, 8, 9 and 11 indicates a free roller, numeral 4 indicates a tension detector (inlet), numeral 7 indicates a fixed rod (outer diameter 5 mmφ) of stainless steel SUS 304, numeral 10 indicates a tension detector (outlet), numeral 12 indicates a guide roller, and numeral 13 indicates a take-up reel.

A film cut in a width of ½ inch is moved (frictioned) at a rate of 200 cm/minutes under an environment having a temperature of 20° C. and a humidity of 60% while it is contacted to the fixed rod 7 (surface roughness 0.3 μm) at an angle of θ=152/180 π radian (152°). The tension controller 2 is adjusted such that an inlet tension $T_1$ is 35 g, and an outlet tension ($T_2$: g) is detected with the outlet tension detector after the film is allowed to run 90 m. The running friction coefficient μk is calculated on the basis of the following equation.

$$\mu k = \frac{2.303}{\pi} \log \frac{T_2}{T_1} = 0.868 \log \frac{T_2}{35}$$

(5) Calender Abrasion Resistance

The abrasion resistance of the running surface of a film is evaluated with a three-roll mini-super calender. The calender is a three-roll calender using nylon rolls and steel rolls, and the film is allowed to run at a treatment temperature of 80° C., under a linear load of 200 kg/cm on the film, at a film running rate of 150 m/minute. The base film is evaluated for abrasion resistance on the basis of dust adhering to the top roller of the calender when the film has been allowed to run a total length of 6,000 m.

<Evaluation Based on Five Ratings>

1: Nylon roll is completely free of dust.
2: Nylon roll is almost free of dust.
3: Nylon roll is with some dust, but can be cleaned of the dust with dry cloth.
4: Nylon roll is with dust, and cannot be cleaned of the dust with dry cloth, but it can be cleaned with a solvent such as acetone.
5: Nylon roll is heavily with dust, and it is difficult to clean the nylon roll even with a solvent.

(6) Form of Roll

A film is taken up in the form of a roll having a width of 1,100 mm and a length of 15,000 m at a rate of 300 m/minute, and the appearance of the obtained roll is carefully inspected to evaluate it on the basis of the following five ratings.

An even end surface is rated as shown in Table 1 on the basis of a length of an end face deviation in the direction of the film width.

Bump-like projections are rated as shown in Table 1 on the basis of a number of bump-like projections having a long diameter of at least 2 mm.

TABLE 1

| | Items evaluated | |
|---|---|---|
| Ratings | Uneven end face Length of deviation in longitudinal direction (mm) | Bump-like projections Number of projections as great as at least 2 mm |
| 1 | less than 0.5 | 0 |
| 2 | 0.5–less than 1.0 | 1–2 |
| 3 | 1.0–less than 3.0 | 3–5 |
| 4 (not acceptable) | 3.0–less than 8 | 6–10 |
| 5 (not acceptable) | at least 8 | at least 11 |

(7) Electromagnetic Characteristics of Magnetic Tape

A signal prepared by overlapping 50% white level signal (the peak:to:peak voltage of 100% white level signal is 0.714 volt) with 100% chroma level signal is recorded with a commercially available home-use VTR, and the play back signal thereof is measured with a Shibasoku noise meter: type 952R. The definition of chroma S/N is as follows according to the definition of Shibasoku.

$$\text{Chroma } S/N \ (dB) = 20 \log \frac{ES(p-p)}{EN(rms)}$$

wherein ES (p-p) is a peak:to:peak voltage difference (p-p) of reproduced signal of white level signal, ES (p-p)=0.714V (p-p), and EN (rms) is a square root of peak voltage of chroma signal level.

EXAMPLES 1–4 AND COMPARATIVE EXAMPLES 1–3

Dimethyl terephthalate and ethylene glycol were polymerized in the presence of manganese acetate as an ester exchange catalyst, antimony trioxide as a polymerization catalyst, phosphorous acid as a stabilizer and inert fine particles shown in Table 2 or 3 as a lubricant according to a conventional method, to obtain polyethylene terephthalates having an intrinsic viscosity (in o-chlorophenol, 35° C.) of 0.62 for first and second polyester surface layers.

The above polyethylene terephthalates were dried at 170° C. for 3 hours, fed to different extruders of a co-extrusion film-forming machine for forming first and second polyester surface layers, and co-extruded through a two-layer die such that the first polyester surface layer (to be referred to as layer A hereinafter):second polyester surface layer (to be referred to as layer B hereinafter) thickness ratio of 95:5, to obtain an unstretched film.

The above-obtained unstretched film was preheated at 78° C., stretched 2.3 times in the longitudinal direction by heating it between high-speed and low-speed rolls with an IR heater having a surface temperature of 850° C. located 15 mm above the film, rapidly cooled, and stretched 4.0 times in the transverse direction at 100° C. with a stenter.

Further, the above biaxially stretched film was pre-heated at 110° C., and stretched 2.2 times in the longitudinal direction between low-speed and high-speed rolls. The so-obtained film was heat-set with hot air at 215° C. for 4 seconds to give a biaxially oriented laminated polyester film having a thickness of 7.5 µm.

Separately, tile following composition was placed in a ball mill and kneaded and dispersed for 16 hours, and 5 parts by weight of an isocyanate compound (Desmodur L, supplied by Bayer AG) was added to the composition, and the mixture was shear-dispersed at a high rate for 1 hour to obtain a magnetic coating composition.

Composition for magnetic coating composition:

Acicular Fe particles 100 parts by weight

Vinyl chloride-vinyl acetate copolymer (Eslec A. supplied by Sekisui Chemical Co.. Ltd.) 15 parts by weight Thermoplastic polyurethane resin 5 parts by weight Chromium oxide 5 parts by weight Carbon black 5 parts by weight Lecithin 2 parts by weight Fatty acid ester 1 part by weight Toluene 50 parts by weight Methyl ethyl ketone 50 parts by weight Cyclohexanone 50 parts by weight The above magnetic coating composition was coated on one surface (layer A) of the biaxially oriented laminated polyester film to form a 3 µm thick magnetic layer, and the magnetic layer was subjected to orientation treatment in a direct current magnetic field of 2,500 gauss, dried under heat at 100° C. and super-calendered (linear pressure 200 kg/cm, temperature 80° C.). Then, the film was taken up in the form of a roll. The film roll was allowed to stand in an oven at 55° C. for 3 days. Further, a back coating composition shown below was coated to form a 1 µm thick back coating and dried, and the coated film was cut to give a magnetic tape.

Composition for back coat:

Carbon black 100 parts by weight

Thermoplastic polyurethane resin 60 parts by weight

Isocyanate compound (Coronate L, supplied by Nippon Polyurethane Kogyo K.K.) 18 parts by weight Silicone oil 0.5 part by weight Methyl ethyl ketone 250 parts by weight Toluene 50 parts by weight Tables 2 and 3 show properties of films and magnetic tapes obtained as described above.

As is clear in Tables 2 and 3, the film or magnetic tape according to the present invention has a low friction coefficient or excellent lubricity, is excellent in take-up properties and is greatly excellent in electromagnetic characteristics and abrasion resistance. The F-5 value of each film was 19 kg/mm² in the longitudinal direction and 12 kg/mm² in the transverse direction.

TABLE 2

| | Ex. 1 | Ex. 2 | Ex. 3 | Ex. 4 |
|---|---|---|---|---|
| layer A | | | | |
| Small inert fine particles | | | | |
| Kind | alumina (θ) | alumina (θ) | alumina (θ) | silica |
| Average particle diameter (µm) | 0.22 | 0.22 | 0.22 | 0.16 |
| Amount (wt %) | 0.20 | 0.40 | 0.60 | 0.15 |
| Large inert | | | | |

TABLE 2-continued

|  | Ex. 1 | Ex. 2 | Ex. 3 | Ex. 4 |
|---|---|---|---|---|
| fine particles | | | | |
| Kind | silicone resin | silicone resin | silicone resin | calcium carbonate |
| Average particle diameter (μm) | 0.78 | 0.78 | 0.78 | 0.68 |
| Amount (wt %) | 0.004 | 0.006 | 0.010 | 0.008 |
| layer B | | | | |
| Small inert fine particles | | | | |
| Kind | alumina | alumina | alumina | silica |
| Average particle diameter (μm) | 0.22 | 0.22 | 0.22 | 0.16 |
| Amount (wt %) | 0.4 | 0.4 | 0.4 | 0.16 |
| Large inert fine particles | | | | |
| Kind | silicone resin | silicone resin | silicone resin | calcium carbonate |
| Average particle diameter (μm) | 0.78 | 0.78 | 0.78 | 0.68 |
| Amount (wt %) | 0.10 | 0.10 | 0.10 | 0.25 |
| Layer A thickness/ total thickness (μm) | 7.1/7.5 | 7.1/7.5 | 7.1/7.5 | 7.1/7.5 |
| Film Properties Surface roughness Layer A surface | | | | |
| $R_{aA}$ | 3.7 | 5.2 | 6.8 | 4.4 |
| $R_{ZA}$ | 76 | 88 | 102 | 64 |
| $R_{ZA}/R_{aA}$ | 20.5 | 16.9 | 15.0 | 14.5 |
| Layer B surface | | | | |
| $R_{aA}$ | 12 | 12 | 12 | 13 |
| $R_{ZA}$ | 133 | 132 | 132 | 138 |
| Static friction coefficient (μs) | 0.65 | 0.60 | 0.45 | 0.63 |
| Dynamic friction coefficient (to metal) (μk) | 0.30 | 0.29 | 0.27 | 0.30 |
| Roll form | | | | |
| Uneven end face | 1 | 2 | 2 | 1 |
| Bump-like projections | 2 | 2 | 1 | 2 |
| Abrasion resistance | | | | |
| First layer | 2 | 2 | 2 | 3 |
| Second layer | 3 | 3 | 3 | 3 |
| Electromagnetic characteristics (dB) | +2.8 | +2.4 | +1.9 | +2.2 |

Ex. = Example

TABLE 3

|  | CEx. 1 | CEx. 2 | CEx. 3 |
|---|---|---|---|
| Layer A | | | |
| Small inert fine particles | | | |
| Kind | alumina | alumina | kaolin |
| Average particle diameter (μm) | 0.22 | 0.22 | 0.42 |
| Amount (wt %) | 0.2 | 0.6 | 0.5 |
| Large inert fine particles | | | |
| Kind | — | — | — |
| Average particle diameter (μm) | — | — | — |
| Amount (wt %) | — | — | — |
| Layer B | | | |
| Small inert fine particles | | | |
| Kind | alumina | alumina | kaolin |
| Average particle diameter (μm) | 0.22 | 0.22 | 0.82 |
| Amount (wt %) | 0.4 | 0.4 | 0.2 |
| Large inert fine particles | | | |
| Kind | silicone resin | silicone resin | — |
| Average particle diameter (m) | 0.78 | 0.78 | |
| Amount (wt %) | 0.10 | 0.10 | — |
| Layer A thickness/ total thickness (μm) | 7.1/7.5 | 7.1/7.5 | 7.1/7.5 |

CEx. = Comparative Example

According to the present invention, there can be provided a biaxially oriented laminated polyester film which retains a flatness that can meet with the achievement of the high density recording and high quality of a magnetic tape, which has excellent take-up properties and gives an excellent roll form, and which is also excellent in lubricity, abrasion resistance and scratch resistance.

What is claimed is:

1. A biaxially oriented laminated polyester film comprising a first polyester surface layer having
(a1) a central line average roughness $R_{aA}$ of 1 to 7.9 nm,
(b1) a 10-points average roughness $R_{ZA}$ of 15 to 400 nm and
(c1) an $R_{ZA/RaA}$ ratio of 11–51, said first polyester surface layer containing 0.05 to 1.5% by weight of first small inert fine particles having an average particle diameter of 0.01 to 0.5 μm, and first large inert fine particles whose average particle diameter is greater than the average particle diameter of the first small inert fine particles by at least 0.1 μm and is 0.1 to 2.5 μm, in an amount of ¼ or less of the above first small inert fine particles, and a second polyester surface layer having
(a2) a central line average roughness $R_{aB}$ which is greater than $R_{aA}$ and is 5 to 40 nm,
(b2) a 10-points average roughness $R_{ZB}$ of 75 to 600 nm and
(c2) an $R_{ZB}/R_{aB}$ ratio of 20 or less, and satisfying the relationship between the first polyester surface layer and the second polyester surface layer, which is represented by the following expressions, $$R_{aA} \times \sqrt{R_{aB}} < 50 \qquad (1)$$

$$R_{ZA} \times \sqrt{R_{ZB}} = 130 \text{ to } 3{,}000. \qquad (2)$$

2. The biaxially oriented laminated polyester film of claim 1, wherein the first polyester surface layer has an $R_{aA}$ of 1 to 5.8 nm.

3. The biaxially oriented laminated polyester film of claim 1, wherein the first polyester surface layer has an $R_{ZA}$ of 40 to 240 nm.

4. The biaxially oriented laminated polyester film of claim 1, wherein the first polyester surface layer has an $R_{ZA}/R_{aA}$ ratio of 13–30.

5. The biaxially oriented laminated polyester film of claim 1, wherein $R_{aB}$ of the second polyester surface layer is greater than $R_{aA}$ and is 5 to 25 nm.

6. The biaxially oriented laminated polyester film of claim 1, wherein the second polyester surface layer has an $R_{ZB}$ of 75 to 350 nm.

7. The biaxially oriented laminated polyester film of claim 1, wherein the second polyester surface layer has an $R_{ZB}/R_{aB}$ ratio of 5–11.

8. The biaxially oriented laminated polyester film of claim 1, wherein the biaxially oriented laminated polyester film satisfies the relationship between the first polyester surface layer and the second polyester surface layer, which is represented by the following expression (1)-1, $$R_{aA} \times \sqrt{R_{aB}} < 30. \qquad (1)\text{-}1$$

9. The biaxially oriented laminated polyester film of claim 1, wherein the biaxially oriented laminated polyester film satisfies the relationship between the first polyester surface layer and the second polyester surface layer, which is represented by the following expression (2)-1, $$R_{ZA} \times \sqrt{R_{ZB}} = 200 \text{ to } 2{,}000. \qquad (2)\text{-}1$$

10. The biaxially oriented laminated polyester film of claim 1, wherein the second polyester surface layer contains 0.1 to 5% by weight of second inert fine particles having an average particle diameter of 0.3 to 2 µm.

11. The biaxially oriented laminated polyester film of claim 1, wherein the second polyester surface layer contains 0.05 to 3% by weight of second small inert fine particles having an average particle diameter of 0.03 to 1 µm, and 0.005 to 2% by weight of second large inert fine particles whose average particle diameter is greater than the average particle diameter of the second small inert fine particles by at least 0.1 µm and is 3 µm or less.

12. A magnetic recording medium comprising the biaxially oriented laminated polyester film as recited in claim 1 and a magnetic recording layer formed on the first polyester surface layer of said biaxially oriented laminated polyester film.

\* \* \* \* \*